United States Patent
Iguchi et al.

(10) Patent No.: US 8,853,115 B2
(45) Date of Patent: Oct. 7, 2014

(54) DIELECTRIC CERAMIC COMPOSITION AND ELECTRONIC DEVICE

(71) Applicant: TDK Corporation, Tokyo (JP)

(72) Inventors: Toshihiro Iguchi, Tokyo (JP); Akitoshi Yoshii, Tokyo (JP); Tatsuya Kojima, Tokyo (JP); Satoshi Takagi, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 13/773,370

(22) Filed: Feb. 21, 2013

(65) Prior Publication Data

US 2013/0222969 A1    Aug. 29, 2013

(30) Foreign Application Priority Data

Feb. 29, 2012    (JP) ................. 2012-044017

(51) Int. Cl.
*C04B 35/495* (2006.01)
*C04B 35/50* (2006.01)
(Continued)

(52) U.S. Cl.
CPC ......... *C04B 35/50* (2013.01); *C04B 2235/3215* (2013.01); *C04B 2235/3239* (2013.01);
(Continued)

(58) Field of Classification Search
CPC .................. C04B 35/495; C04B 35/50; C04B 2235/3224; C04B 2235/3225; C04B 2235/3227; C04B 2235/3229; C04B 2235/3251; C04B 2235/76

USPC ................................. 501/135, 152; 36/321.4
See application file for complete search history.

(56) References Cited

U.S. PATENT DOCUMENTS 7,674,738 B2 *  3/2010  Kubota ................. 501/135
7,727,921 B2 *  6/2010  Takeda ................. 501/135
7,742,278 B2 *  6/2010  Takeda ................. 361/321.2

FOREIGN PATENT DOCUMENTS

CN      101531512 A    4/2009
CN      101631754 A    1/2010
JP      2004-342487 A  12/2004

OTHER PUBLICATIONS

Masuno, "X-Ray and Dielectric Studies of the Systems (Ba1-xR2x/3)Nb2O6, Where R is Y, Sm or La," Journal of the Physical Society of Japan, vol. 19, No. 3, Mar. 1964, pp. 323-328.

(Continued)

*Primary Examiner* — Karl Group
(74) *Attorney, Agent, or Firm* — Arent Fox LLP

(57) ABSTRACT

A dielectric ceramic composition comprising a compound shown by a general formula $\{A_{1-x}(RE)_{2x/3}\}_y\text{-}D_2O_{5+y}$ having tungsten bronze-type structure and an oxide of "M". "A" is at least one selected from Ba, Ca, Sr and Mg, "D" is at least one selected from Nb and Ta, "RE" is at least one selected from Sc, Y, La, Ce, Pr, Nd, Sm, Eu, Gd, Tb, Dy, Ho, Er, Tm, Yb and Lu, "x" and "y" satisfies 0<x<1 and y>0, respectively and said "M" is at least one selected from Al, Si, B and Li. It is preferable to further comprise Mg oxide.

9 Claims, 1 Drawing Sheet

(51) Int. Cl.
*H01G 4/10* (2006.01)
*C04B 35/626* (2006.01)
*H01G 4/12* (2006.01)
*H01G 4/30* (2006.01)
*C01G 33/00* (2006.01)

(52) U.S. Cl.
CPC . *C04B 2235/3409* (2013.01); *C04B 2235/3418* (2013.01); *C04B 2235/3272* (2013.01); *C04B 2235/3256* (2013.01); *C04B 2235/9615* (2013.01); *C04B 2235/3258* (2013.01); *C04B 2235/6562* (2013.01); *C04B 2235/3208* (2013.01); C04B 35/6263 (2013.01); *C04B 2235/3229* (2013.01); *C04B 2235/3251* (2013.01); *C04B 2235/3227* (2013.01); C04B 35/495 (2013.01); *C04B 2235/3217* (2013.01); *C04B 2235/656* (2013.01); *C04B 2235/3225* (2013.01); *C04B 2235/3224* (2013.01); *C04B 2235/3203* (2013.01); *C04B 2235/76* (2013.01); *C04B 2235/3262* (2013.01); *C04B 2235/3206* (2013.01); *C04B 2235/3213* (2013.01); *C04B 2235/3241* (2013.01); *C04B 2235/78* (2013.01); H01G 4/1254 (2013.01); H01G 4/1209 (2013.01); H01G 4/30 (2013.01); C01G 33/006 (2013.01)
USPC .................. 501/135; 501/152; 361/321.4

(56) References Cited

OTHER PUBLICATIONS

Sakamoto, et al., "Chemical Solution Processing and Characterization of Highly Oriented (Ba,Ln)Nb2O6 [Ln: La, Gd, Dy] Thin Films," Jpn. J. Appl. Phys. vol. 41 (2002) pp. 6647-6652.

Sakamoto, et al., "Chemical Solution Processing and Properties of Tungsten Bronze (Ba,La)Nb2O6 Thin Films," Integrated Ferroelectrics, 2001, vol. 36, pp. 191-200.

Wakiya, et al., "Synthesis and Dielectric Properties of Ba1-xR2x/3Nb2O6 (R: Rare Earth) with Tetragonal Tungsten Bronze Structure," Journal of the European Ceramic Society, vol. 19 (1999) pp. 1071-1075.

* cited by examiner

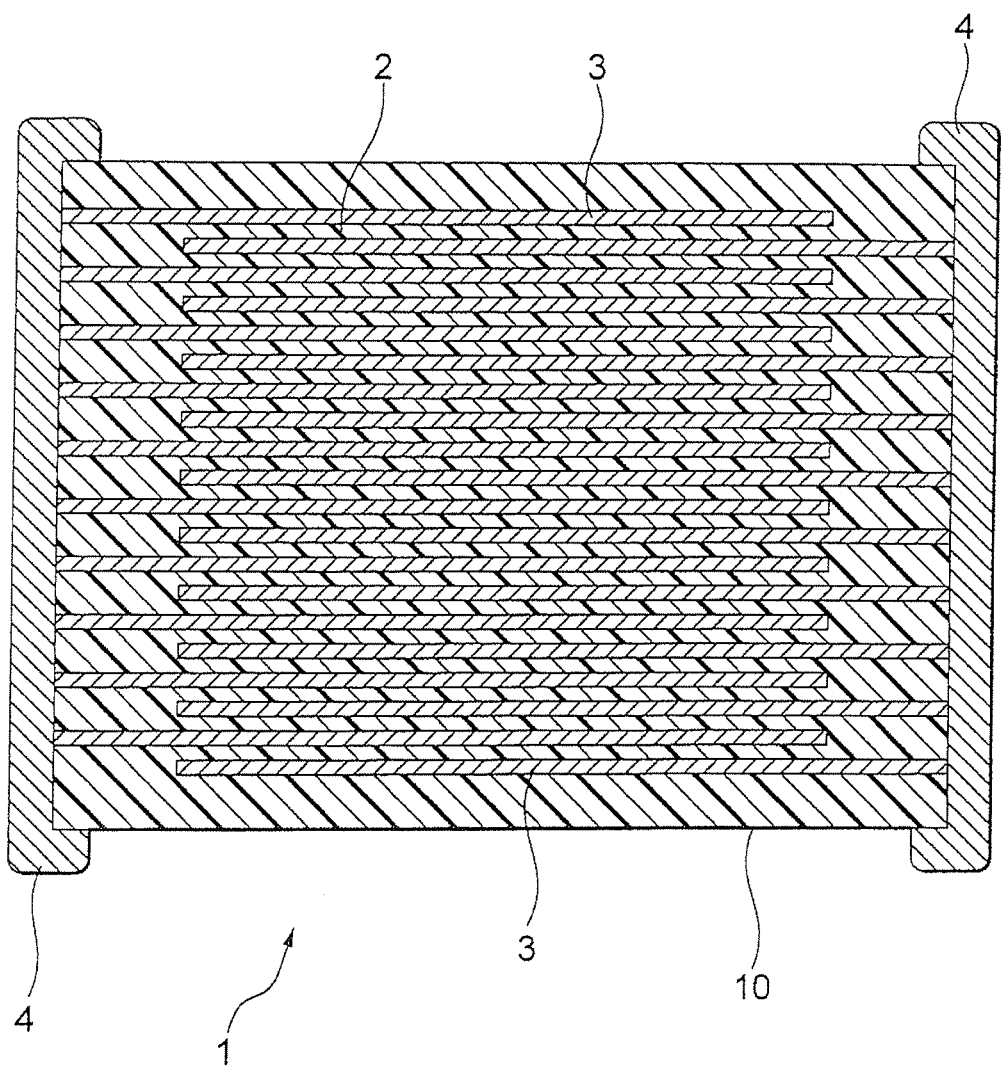

DIELECTRIC CERAMIC COMPOSITION AND ELECTRONIC DEVICE

CROSS-REFERENCE TO RELATED APPLICATION

This application is based upon and claims the benefit of priority of the prior Japanese Patent Application No. 2012-044017, filed Feb. 29, 2012, the disclosure of the prior application is hereby incorporated in its entirety by reference.

BACKGROUND OF THE INVENTION

1. Field of the Invention

The present invention relates to a dielectric ceramic composition and electronic device wherein said dielectric ceramic composition is applied to its dielectric layer. More precisely, the present invention relates to a dielectric ceramic composition having good characteristics under a high electric field intensity, and to an electronic device, wherein said dielectric ceramic composition is applied to dielectric layer, having an electrode.

2. Description of the Related Art

In recent years, a demand for a high reliability of electronic device is high. For instance, size reduction and high performance of multilayer ceramic capacitor, an example of electronic device, is rapidly processing; while its use is expanding. As a result, various characteristics are required for such capacitors.

Conventionally, ceramic composition showing ferroelectricity (ferroelectrics), such as barium titanate, is often used for dielectric layer of electronic device, such as capacitor.

However, when electronic device having dielectric layer of ferroelectrics is used under a high rated voltage, namely, when it is used under a high field intensity, various problems due to ferroelectricity of the ceramic composition were caused.

For instance, there was a problem that specific permittivity rapidly decreases as field intensity increases; and as a result, effective capacitance under used environment decreases. In addition, there were problems that capacitance of capacitor decreases as specific permittivity of dielectrics decreases, which leads to deterioration of DC-Bias characteristic, and cracks or noises due to electrostriction generate. There was also a problem such as a deterioration of capacitance change rate with respect to temperature.

In addition, sintering may be insufficient during firing process to obtain ceramic composition; and moisture resistance could have been deteriorated or structural deficiency could have been occurred.

Further, there was a demand for a desired sintering property at the lowest possible temperature when firing.

Therefore, dielectric ceramic composition having good characteristics (such as specific permittivity or DC-Bias characteristic) is required, even when field intensity is high (e.g. superimposed direct current).

Further, there was a demand for a dielectric ceramic composition of sufficient sintering properties having good moisture resistance wherein structural deficiency is not occurred.

The below descried Article 1 describes a compound wherein rare-earth element is solid solved in $BaNb_2O_6$ having tungsten bronze-type structure.

[Article 1] Kunio Masuno, "X-Ray and Dielectric Studies of the Systems $(Ba_{1-x}R_{2x/3})Nb_2O_6$, Where R is Y, Sm or La", Journal of the Physical Society of Japan, 1964, Vol. 19, No. 3, p. 323-328

SUMMARY OF THE INVENTION

The present invention has been made by considering the above circumstances, and a purpose of the present invention is to provide a dielectric ceramic composition having good characteristics under high electric field intensity and good sintering properties and to an electronic device wherein said dielectric ceramic composition is applied to dielectric layer and the device is provided with an electrode.

In order to achieve the above purpose, dielectric ceramic composition according to the present invention comprises a compound shown by a general formula $\{A_{1-x}(RE)_{2x/3}\}_y\text{-}D_2O_{5+y}$ having tungsten bronze-type structure and an oxide of "M", wherein said A is at least one selected from Ba, Ca, Sr and Mg, said "D" is at least one selected from Nb and Ta, said RE is at least one selected from Sc, Y, La, Ce, Pr, Nd, Sm, Eu, Gd, Tb, Dy, Ho, Er, Tm, Yb and Lu, said "x" and "y" satisfies $0<x<1$ and $y>0$, respectively, and said "M" is at least one selected from Al, Si, B and Li.

Note that the above compound shows relatively low specific permittivity when field intensity is low (e.g. when direct current is not superimposed). However, said compound is paraelectric and that there is little decline in its specific permittivity even when field intensity increases, which differs from ferroelectrics of barium titanate and the like. Therefore, under a high field intensity, dielectric ceramic composition of the invention show better characteristics (e.g. DC-Bias characteristic) than ferroelectrics.

In addition, dielectric ceramic composition of the present invention comprises an oxide of "M". Sintering property of dielectric ceramic composition of the present invention can be improved by including such oxide. As a result, dielectric ceramic composition of the present invention will be sufficiently sintered; and will be effective to improve moisture resistance property and to prevent structural deficiency.

Preferably, the composition further comprises an oxide of Mg.

Preferably, the composition further comprises an oxide of at least one selected from Ti and Zr.

Preferably, content of the above "M" oxide with respect to 100 moles of said compound is 0.5 to 5.0 moles in terms of element.

This allows further improvement in effect of the present invention.

Further, electronic device according to the present invention comprises a dielectric layer, composed of dielectric ceramic composition described any of the above, and an electrode. Although electronic device is not particularly limited, electronic device used under a high rated voltage is preferable. A multilayer ceramic capacitor is exemplified for such electronic device.

BRIEF DESCRIPTION OF THE DRAWINGS

FIG. 1 is a cross-sectional view of a multilayer ceramic capacitor according to an embodiment of the present invention.

DETAILED DESCRIPTION OF THE INVENTION

Hereinafter, the present invention will be described based on embodiments shown in drawings.

(Multilayer Ceramic Capacitor 1)

As is shown in FIG. 1, multilayer ceramic capacitor 1 has a capacitor element body 10 in which dielectric layers 2 and internal electrode layers 3 are alternately stacked. On both ends of capacitor element body 10, a pair of external electrodes 4 is respectively conducted to internal electrode layers 3, alternately stacked within capacitor element body 10. Although a shape of capacitor element body 10 is not particularly limited, it is generally a rectangular parallelpiped. Further, its size is also not particularly limited and may be a suitable size according to its use.

(Dielectric Layer 2)

The dielectric layer 2 is constituted from a dielectric ceramic composition according to the present embodiment. The dielectric ceramic composition is shown by a general formula $\{A_{1-x}(RE)_{2x/3}\}_y\text{-}D_2O_{5+y}$ and comprises a compound having tungsten bronze-type structure and an oxide of "M".

Said compound is a compound wherein "A" element in $A_yB_2O_{5+y}$ compound having tungsten bronze-type structure is substituted (solid solved) for "RE" element. In the present embodiment, said compound is paraelectric. With this paraelectricity of said compound, said dielectric ceramic composition may show superior DC bias characteristic, show a small capacitance change rate with respect to temperature, and prevent crack or noise due to electrostriction.

"X" shows substituted amount of "RE" element with respect to "A" element and 0<x<1. In the present embodiment, "x" is preferably larger than 0.20 and is more preferably 0.23 or more. By determining "x" within the above range, relatively high specific permittivity can be easily obtained while showing good sintering properties.

Further, "x" is preferably less than 0.50, and more preferably 0.48 or less. By determining "x" within the above range, relatively high specific permittivity can be easily obtained while showing good sintering properties.

"y" shows a ratio of "A" and "RE" elements with respect to "D" element, and y>0. In the present embodiment, "y" is preferably 0.700 or more. By setting "y" within the above range, relatively high specific permittivity can be easily obtained while showing good sintering properties. Further, it is preferable that "y" is 1.200 or less. By setting "y" within the above range, relatively high specific permittivity can be easily obtained while showing good sintering properties.

In the present embodiment, "A" element in the above general formula is at least one selected from Ba, Ca, Sr and Mg; and Ba is preferable.

Further, "D" element is at least one selected from Nb and Ta; and Nb is preferable.

"RE" element is at least one selected from Sc, Y, La, Ce, Pr, Nd, Sm, Eu, Gd, Tb, Dy, Ho, Er, Tm, Yb and Lu; and La is preferable. By including "RE" element, relatively high specific permittivity can be easily obtained while maintaining paraelectric.

An oxide of "M" element improves sintering property of dielectric ceramic composition of the present embodiment. Said "M" element is at least one selected from Al, Si, B and Li, and is preferably Al and/or Si. Further, content of said "M" oxide with respect to 100 moles of said compound is 0.5 to 5.0 moles in terms of element.

In the present embodiment, said dielectric ceramic composition is preferable to comprise Mg oxide in addition to the above compound. Grain growth of dielectric particles included in dielectric ceramic composition can be suppressed by comprising Mg oxide. Content of said Mg oxide with respect to 100 moles of said compound is preferably 0.2 to 5.0 moles in terms of Mg.

In the present embodiment, said dielectric ceramic composition is preferable to comprise an oxide of Ti and/or Zr in addition to the above compound. High contraction ratio can be obtained even at a low firing temperature by comprising the above oxide. Content of said oxide with respect to 100 moles of said compound is preferably 0.2 to 0.5 moles in terms of element.

Dielectric ceramic composition according to the present embodiment may further comprise the other component in accordance with the desired characteristics. For instance, it may comprise oxide of at least one selected from V, Mo, Fe, W, Mn and Cr. Content of said oxide with respect to 100 moles of said compound is preferably 0.05 to 5 moles in terms of element.

In the present embodiment, although crystal particle diameters of dielectric particles are particularly not limited, they are not preferable to be too large to influence the mechanical strength of dielectric ceramic composition. In the present embodiment, excessive particle growth of crystal particles are determined "excessive particle growth". Generation of such "excessive particle growth" can be evaluated by such as the following method.

First, surface of green compact before firing was observed by metallograph; and then presence and absence of particles additional to a predetermined area was evaluated. Next, surface of dielectric ceramic composition after firing was observed by metallograph, and then presence and absence of crystal particles additional to a predetermined area was evaluated. Then, when particles were not observed additional to a predetermined area before firing, and particles were observed additional to a predetermined area after firing, it was determined a generation of "excessive particle growth".

Thickness of dielectric layer 2 is suitably determined according to its use and the like. Multilayered number of dielectric layer 2 may also be suitably determined according to its use and the like.

(Internal Electrode Layer 3)

Conducting material included in internal electrode layer 3 is not particularly limited; and a well-known conducting material, such as Ni, Cu, Ag, Pd and alloys thereof, can be used. Thickness of internal electrode layer 3 is suitably determined according to its use and the like.

(External Electrode 4)

Conducting material included in external electrode 4 is not particularly limited, and well-known conducting materials, such as Ni, Cu, Ag, Pd, Pt and alloys thereof and conductive resin, can be used. Thickness of external electrode 4 may be suitably determined in accordance with its use and the like.

(Manufacturing Method of Multilayer Ceramic Capacitor 1)

Multilayer ceramic capacitor 1 according to the present embodiment may be manufactured by a well-known method. In the present embodiment, green chip is manufactured by using paste, and then by firing them, a multilayer ceramic capacitor is manufactured. Manufacturing method will be concretely described below.

Firstly, dielectric material for forming dielectric layer is prepared, and then made to a paste in order to prepare a dielectric layer paste.

In the present embodiment, raw materials of a compound shown by a general formula $\{A_{1-x}(RE)_{2x/3}\}_y\text{-}D_2O_{5+y}$ and that of "M" oxide are prepared, and then mixed to make dielectric raw materials. If needed, a raw material of Mg oxide or a raw material of Ti and/or Zr oxide is prepared, and then mixed with the above raw materials to make dielectric raw materials.

As for raw materials of the above compound or oxide; oxides, their mixtures and their composite oxides may be used. Further, variety of compounds which become the above oxides or composite oxides after firing may also be used.

For instance, as for raw material of the above compound, oxide or carbonation of "A" element, oxide or hydroxide of "RE" element and oxide of "D" element may be prepared. Preliminary fired material, obtained by weighing these oxides et al. to be a predetermined composition, mixing the composition, and preliminary firing the mixture at predetermined temperature, may be raw material of the above compound Dielectric layer paste is obtained by kneading raw materials of the above described conductive materials, binder and solvent. Well-known materials can be used for the binder and the solvent. Said paste may include additives such as plasticizer, if required.

Internal electrode paste is obtained by kneading the above described dielectric raw materials, binder and solvent. Well-known materials can be used for the binder and the solvent. Said paste may include additives such as inhibitor and plasticizer, if required.

External electrode paste may be prepared in the same way as the internal electrode paste is prepared.

Green sheet and internal electrode pattern are formed by using the obtained pastes, and then green chip is obtained by laminating the same.

The binder removal process is performed to the obtained green chip, if required. Binder removal process condition may be a well-known condition, and for instance, a holding temperature is preferably 180 to 400° C.

After a binder removal processing, green chip is fired and a capacitor element body as a sintered body is obtained. The other firing conditions may be well-known conditions, and for instance, a holding temperature is preferably 1150 to 1350° C.

End surface polishing is performed to the above obtained capacitor element body, external electrode paste is pasted and then baked, and external electrode 4 is formed. A cover layer is then formed by plating, etc. on the surface of the external electrode 4, when necessary.

A multilayer ceramic capacitor of the present embodiment produced as above is mounted on a printed substrate, etc. by such as soldering, and used for a variety of electronic apparatuses, etc.

An embodiment of the present invention is explained above, but the present invention is not limited to the above embodiment and may be variously modified within the scope of the present invention.

For instance, in the above embodiment, a multilayer ceramic capacitor is explained as an example of ceramic electronic device according to the present invention, but ceramic electronic device according to the present invention is not limited to the multilayer ceramic capacitor and may be any as far as it includes the above constitution.

EXAMPLE

Below, the present invention will be explained based on furthermore detailed examples, but the present invention is not limited to the examples.

Example 1

At first, a compound powder shown by a general formula $\{A_{1-x}(RE)_{2x/3}\}_y \cdot D_2O_{5+y}$ was prepared. In the general formula, "A" element is Ba, "RE" element is La, "D" element is Nb, "x" is 0.40 and "y" is 1.000.

Next, as a raw material of "M" oxide, $Al_2O_3$ powder, $SiO_2$ powder, $B_2O_3$ powder and $Li_2O$ powder were prepared.

And then, each raw material was weighed and mixed so as to make the composition after firing become the composition shown in Table 1, and dielectric raw material was obtained.

Next, ion-exchange water and polyvinyl alcohol were poured in a container, mixed for 2 hours at 85° C., and then polyvinyl alcohol aqueous solution was obtained. Concentration of the aqueous solution was made to 6 wt % by regulating an amount of ion-exchange water.

20 wt % of polyvinyl alcohol aqueous solution with respect to 100 wt % of the prepared dielectric raw materials was added, mixed and granulated in a mortar, and then granulated powder was obtained. The obtained granulated powder was poured into a mold of Φ11.1 mm, press formed under a pressure of 10 kg/cm², and then a disk-shaped green compact was obtained.

Next, the obtained green compact was fired in air and a disk-shaped sintered body was obtained. Firing conditions were a temperature rising rate of 200° C./h, a holding temperature of 1300° C., and a holding time of 2 hours.

Contraction ratio of the obtained sintered body was measured by methods described below. Measurements are shown in Table 1. Subsequently, In—Ga electrode of Φ6 mm was coated on both principal surfaces of the sintered body, baking treatment was performed, and then, disk-shaped ceramic capacitor sample was obtained.

Further, in example 1, capacitor sample was manufactured using a compound shown by a general formula $BaTiO_3$, for a comparison of the above samples. First, powder of the compound was prepared as dielectric raw materials. Disk-shaped ceramic capacitor sample was prepared by the same method as the above samples, except for using the above powder.

Specific permittivity and DC-Bias characteristics of the obtained each capacitor sample were respectively evaluated by the methods described below. Evaluation results are shown in Table 1. Note that specific permittivity and DC-Bias characteristic of capacitor sample, using compound shown by a general formula $BaTiO_3$, were evaluated.

(Contraction Ratio)

First, diameter R of the obtained sintered body was measured. Then, contraction ratio was calculated by the following formula based on diameter RA and diameter R of mold.

contraction ratio (%)=100×(RA−R)/RA

A large contraction ratio indicates a high density of sintered body. Moisture resistance improves when density of sintered body is raised; and that electronic devices suitably used even under a high-humidity environment can be obtained. In addition, hardness of the sintered body improved as its density was heightened, which made it possible to prevent structural deficiency. In the present examples, contraction ratio of 16.5% or more is determined good. Results are shown in Table 1.

(Specific Permittivity)

Capacitance C of a capacitor sample was measured under frequency of 1 kHz and measured voltage of 1 Vrms at reference temperature of 25° C. using 4284A by HP Co. Then, specific permittivity was calculated by thickness of a sintered body, effective electrode area, and capacitance C, which was obtained from the measurement. In the present examples, a high specific permittivity is preferable and 250 or more is more preferable. Results are shown in Table 1.

(DC-Bias Characteristic)

First, samples for measuring DC bias characteristic were manufactured. Binder resin and solvent were mixed to the above prepared dielectric raw materials to make paste. Green sheet was formed by using the obtained paste, Pt electrode was printed thereon, binder removal process, reduction firing and reoxidation treatment were performed, and then a multilayer ceramic capacitor sample was manufactured. Distance between Pt electrodes (thickness of dielectric layer) was 5 μm and a number of laminated dielectric layers were 4. Capacitance of the obtained samples were measured under a measured condition of frequency at 1 kHz and measured voltage at 1 Vrms with not impressing direct current or with impressing direct current at 20 V/μm. And a change rate of capacitance with not impressing direct current with respect to capacitance with impressing direct current was determined to DC-Bias characteristic. Namely, when DC-Bias characteristic is negative, capacitance decreases as direct current impresses. In the present example, DC-Bias characteristic closest to 0 is preferable, and within ±5% were determined good. Results are shown in Table 1.

mixture so that the composition after firing show the composition shown in Table 2. And then contraction ratio, specific permittivity and further, the following "excessive particle growth" were evaluated. Results are shown in Table 2.

TABLE 1

| | $(Ba_{1-x}La_{2x/3})_y Nb_2O_{5+y}$ | | Oxide | | | | Characteristics of a sintered body | | |
|---|---|---|---|---|---|---|---|---|---|
| | | | Al | Si | B | Li | Specific | Contraction Ratio | DC-Bias |
| Samples | x | y | [mol] | [mol] | [mol] | [mol] | Permittivity | [%] | (20 V/μm) |
| $BaTiO_3$ | — | — | — | — | — | — | 1238 | — | −78% |
| 1 | 0.40 | 1.000 | — | — | — | — | 429 | 16.2 | −2% |
| 2 | 0.40 | 1.000 | — | 0.1 | — | — | 427 | 16.8 | −2% |
| 3 | 0.40 | 1.000 | — | 0.5 | — | — | 422 | 17.1 | −2% |
| 4 | 0.40 | 1.000 | — | 1.0 | — | — | 420 | 17.4 | −2% |
| 5 | 0.40 | 1.000 | — | 2.0 | — | — | 423 | 17.4 | −2% |
| 6 | 0.40 | 1.000 | — | 3.0 | — | — | 426 | 17.4 | −2% |
| 7 | 0.40 | 1.000 | — | 4.0 | — | — | 350 | 17.5 | −2% |
| 8 | 0.40 | 1.000 | — | 5.0 | — | — | 320 | 17.4 | −2% |
| 9 | 0.40 | 1.000 | — | 6.0 | — | — | 248 | 17.5 | −2% |
| 10 | 0.40 | 1.000 | 1.0 | — | — | — | 405 | 17.5 | −2% |
| 11 | 0.40 | 1.000 | 2.0 | — | — | — | 394 | 17.4 | −2% |
| 12 | 0.40 | 1.000 | 3.0 | — | — | — | 384 | 17.4 | −2% |
| 13 | 0.40 | 1.000 | 4.0 | — | — | — | 350 | 17.4 | −2% |
| 14 | 0.40 | 1.000 | 5.0 | — | — | — | 330 | 17.5 | −2% |
| 15 | 0.40 | 1.000 | 6.0 | — | — | — | 220 | 17.4 | −2% |
| 16 | 0.40 | 1.000 | 1.0 | 1.0 | — | — | 408 | 17.4 | −2% |
| 17 | 0.40 | 1.000 | — | — | 1.0 | — | 410 | 17.6 | −2% |
| 18 | 0.40 | 1.000 | — | — | — | 1.0 | 420 | 17.7 | −2% |

Contents of oxides are shown in terms of element, with respect to 100 moles of $(Ba_{1-x}La_{2x/3})_y Nb_2O_{5+y}$ In Table 1, samples 2 to 18, including M oxide, were confirmed to show higher contraction ratio and better sintering properties, when compared to sample 1, not including M oxide.

In particular, samples 3 to 8, 10 to 14 and 16 to 18, in which content of M oxide is within 0.5 to 5.0, were confirmed to show higher contraction ratio and relatively high specific permittivity, when compared to sample 1.

Example 2

Samples of ceramic capacitor were manufactured in the same way as sample 4 of Example 1, except using a mixture of a powder of the compound used in example 1, an oxide powder of "M" and an oxide powder of Mg, and regulating the (Evaluation of "Excessive Particle Growth")

First, a range of 5×5 mm on the surface of green compact before firing was observed by metallograph; and then presence and absence of particles having an area of 0.01 mm² or more were evaluated. Next, a range of 5×5 mm on the surface of dielectric ceramic composition after firing was observed by metallograph; and then presence and absence of particles having an area of 0.01 mm² or more were evaluated. Then, when particles having an area of 0.01 mm² or more were not observed before firing, and particles having an area of 0.01 mm² or more were observed after firing, it was determined a generation of "excessive particle growth". Note that none of samples in the present examples were observed to have a particle having an area of 0.01 mm² or more before firing.

TABLE 2

| | $(Ba_{1-x}La_{2x/3})_y Nb_2O_{5+y}$ | | Oxide | | | | | Characteristics of a sintered body | | |
|---|---|---|---|---|---|---|---|---|---|---|
| | | | Al | Si | B | Li | Mg | Specific | Contraction Ratio | Excessive |
| Samples | x | y | [mol] | [mol] | [mol] | [mol] | [mol] | Permittivity | [%] | Particle Growth |
| 4 | 0.40 | 1.000 | — | 1.0 | — | — | 0.0 | 420 | 17.4 | existence |
| 21 | 0.40 | 1.000 | 1.0 | — | — | — | 1.0 | 397 | 17.6 | non-existence |
| 22 | 0.40 | 1.000 | 2.0 | — | — | — | 1.0 | 386 | 17.6 | non-existence |
| 23 | 0.40 | 1.000 | — | 1.0 | — | — | 1.0 | 411 | 17.6 | non-existence |
| 24 | 0.40 | 1.000 | — | 2.0 | — | — | 1.0 | 414 | 17.6 | non-existence |
| 25 | 0.40 | 1.000 | 1.0 | — | — | — | 2.0 | 389 | 17.8 | non-existence |
| 26 | 0.40 | 1.000 | 2.0 | — | — | — | 2.0 | 379 | 17.8 | non-existence |
| 27 | 0.40 | 1.000 | — | 1.0 | — | — | 2.0 | 403 | 17.8 | non-existence |
| 28 | 0.40 | 1.000 | — | 2.0 | — | — | 2.0 | 406 | 17.8 | non-existence |
| 29 | 0.40 | 1.000 | — | — | 1.0 | — | 1.0 | 398 | 17.3 | non-existence |
| 30 | 0.40 | 1.000 | — | — | — | 1.0 | 1.0 | 405 | 17.4 | non-existence |
| 31 | 0.40 | 1.000 | — | 1.0 | — | — | 0.1 | 410 | 17.6 | existence |
| 32 | 0.40 | 1.000 | — | 1.0 | — | — | 0.2 | 417 | 17.5 | non-existence |

TABLE 2-continued

| | $(Ba_{1-x}La_{2x/3})_y Nb_2 O_{5+y}$ | | Oxide | | | | | Characteristics of a sintered body | | |
|---|---|---|---|---|---|---|---|---|---|---|
| | | | Al | Si | B | Li | Mg | | Contraction | |
| Samples | x | y | [mol] | [mol] | [mol] | [mol] | [mol] | Specific Permittivity | Ratio [%] | Excessive Particle Growth |
| 33 | 0.40 | 1.000 | — | 1.0 | — | — | 0.5 | 415 | 17.5 | non-existence |
| 34 | 0.40 | 1.000 | — | 1.0 | — | — | 5.0 | 310 | 17.2 | non-existence |
| 35 | 0.40 | 1.000 | — | 1.0 | — | — | 6.0 | 238 | 16.6 | non-existence |

Contents of oxides are shown in terms of element, with respect to 100 moles of $(Ba_{1-x}La_{2x/3})_y Nb_2 O_{5+y}$ Table 2 indicates that "excessive particle growth" can be prevented by including 0.2 to 6.0 moles of Mg oxide in addition to the above compound and M oxides in dielectric ceramic composition.

Example 3

Samples of ceramic capacitor were manufactured in the same way as sample 4 of Example 1, except using a mixture of a powder of the compound used in example 1, an oxide powder of Si, an oxide powder of Mg, an oxide powder of Ti and an oxide powder of Zr and regulating the mixture so that the composition after firing show the composition shown in Table 3. And then evaluations in the same way as Example 2 were performed. Results are shown in Table 3.

TABLE 3

| | $(Ba_{1-x}La_{2x/3})_y Nb_2 O_{5+y}$ | | Oxide | | | | | Firing | Characteristics of a sintered body | | |
|---|---|---|---|---|---|---|---|---|---|---|---|
| | | | Al | Si | Ti | Zr | Mg | Temperature | Specific | Contraction Ratio | Excessive Particle |
| Samples | x | y | [mol] | [mol] | [mol] | [mol] | [mol] | [° C.] | Permittivity | [%] | Growth |
| 4 | 0.40 | 1.000 | — | 1.0 | — | — | — | 1300 | 420 | 17.4 | existence |
| 40 | 0.40 | 1.000 | — | 1.0 | — | — | — | 1260 | 390 | 16.6 | existence |
| 41 | 0.40 | 1.000 | — | 1.0 | 1.0 | — | — | 1260 | 407 | 17.2 | existence |
| 42 | 0.40 | 1.000 | — | 1.0 | — | 1.0 | — | 1280 | 422 | 17.2 | existence |
| 43 | 0.40 | 1.000 | — | 1.0 | 1.0 | — | 1.0 | 1260 | 399 | 17.4 | non-existence |
| 44 | 0.40 | 1.000 | — | 1.0 | — | 1.0 | 1.0 | 1280 | 413 | 17.4 | non-existence |

Contents of oxides are shown in terms of element, with respect to 100 moles of $(Ba_{1-x}La_{2x/3})_y Nb_2 O_{5+y}$ From table 3, it was confirmed that when dielectric ceramic composition includes Ti oxide (or Zr oxide) in addition to the above compound and Si oxide, firing temperature can be lowered while maintaining high contraction ratio.

Further, it was confirmed that when dielectric ceramic composition includes Mg oxide in addition to the above compound, Si oxide and Ti oxide (or Zr oxide), firing temperature can be lowered while maintaining high contraction ratio, and further, "excessive particle growth" can be prevented.

Example 4

Samples of ceramic capacitor were manufactured in the same way as sample 4 of Example 1, except "x" and "y" values in a general formula of compound used in example 1 was as shown in Table 4. And then contraction ratio and specific permittivity were evaluated. Results are shown in Table 4.

TABLE 4

| | $(Ba_{1-x}La_{2x/3})_y Nb_2 O_{5+y}$ | | Oxide Si | Characteristics of a sintered body | |
|---|---|---|---|---|---|
| Samples | x | y | [mol] | Specific Permittivity | Contraction Ratio [%] |
| 50 | 0.400 | 0.600 | 1.0 | 90 | 16.6 |
| 51 | 0.400 | 0.700 | 1.0 | 260 | 17.1 |
| 52 | 0.400 | 0.900 | 1.0 | 280 | 17.2 |
| 4 | 0.400 | 1.000 | 1.0 | 420 | 17.4 |
| 54 | 0.400 | 1.100 | 1.0 | 320 | 17.5 |
| 55 | 0.400 | 1.200 | 1.0 | 260 | 17.4 |
| 56 | 0.400 | 1.300 | 1.0 | 190 | 16.5 |

TABLE 4-continued

| | $(Ba_{1-x}La_{2x/3})_y Nb_2 O_{5+y}$ | | Oxide Si | Characteristics of a sintered body | |
|---|---|---|---|---|---|
| Samples | x | y | [mol] | Specific Permittivity | Contraction Ratio [%] |
| 57 | 0.200 | 1.000 | 1.0 | 240 | 18.2 |
| 58 | 0.230 | 1.000 | 1.0 | 310 | 18.1 |
| 59 | 0.300 | 1.000 | 1.0 | 370 | 18.0 |
| 4 | 0.400 | 1.000 | 1.0 | 420 | 17.4 |
| 60 | 0.450 | 1.000 | 1.0 | 340 | 17.2 |
| 61 | 0.480 | 1.000 | 1.0 | 320 | 17.1 |
| 62 | 0.500 | 1.000 | 1.0 | 310 | 16.6 |

Contents of oxides are shown in terms of element, with respect to 100 moles of $(Ba_{1-x}La_{2x/3})_y Nb_2 O_{5+y}$ From Table 4, it was confirmed that samples show high contraction ratio and relatively high specific permittivity when "x" is within 0.23 to 0.48. Further, it was confirmed that samples show high contraction ratio and relatively high specific permittivity when "y" is within 0.700 to 1.200.

In the present example, although a single layered capacitor was mainly evaluated, a multilayer ceramic capacitor wherein dielectric layers and internal electrodes are laminated shows the same characteristics as shown by the capacitor samples of the present examples. As mentioned above, multilayer ceramic capacitor is obtained by firing green chip formed by using paste.

The invention claimed is:

1. A dielectric ceramic composition comprising a compound shown by a general formula $\{A_{1-x}(RE)_{2x/3}\}_y\text{-}D_2O_{5+y}$ having tungsten bronze-type structure and an oxide of "M",
    wherein "A" is at least one selected from Ba, Ca, Sr and Mg, "D" is at least one selected from Nb and Ta, "RE" is at least one selected from Sc, Y, La, Ce, Pr, Nd, Sm, Eu, Gd, Tb, Dy, Ho, Er, Tm, Yb and Lu, "x" and "y" satisfies 0<x<1 and y>0, respectively and said "M" is at least one selected from Al, Si, B and Li.

2. The dielectric ceramic composition as set forth in claim 1 further comprising Mg oxide.

3. The dielectric ceramic composition as set forth in claim 1 further comprising an oxide of at least one selected from Ti and Zr.

4. The dielectric ceramic composition as set forth in claim 2 further comprising an oxide of at least one selected from Ti and Zr.

5. The dielectric ceramic composition as set forth in claim 1 wherein content of the above "M" oxide with respect to 100 moles of said compound is 0.5 to 5.0 moles in terms of element.

6. The dielectric ceramic composition as set forth in claim 2 wherein content of the above "M" oxide with respect to 100 moles of said compound is 0.5 to 5.0 moles in terms of element.

7. The dielectric ceramic composition as set forth in claim 3 wherein content of the above "M" oxide with respect to 100 moles of said compound is 0.5 to 5.0 moles in terms of element.

8. The dielectric ceramic composition as set forth in claim 4 wherein content of the above "M" oxide with respect to 100 moles of said compound is 0.5 to 5.0 moles in terms of element.

9. An electronic device comprising a dielectric layer, constituting dielectric ceramic composition as set forth in claim 1, and an electrode.

* * * * *